(12) United States Patent
McClellion

(10) Patent No.: US 7,156,026 B2
(45) Date of Patent: Jan. 2, 2007

(54) VIDEO GAME CONTROLLER STAND

(76) Inventor: W. Richard McClellion, 120 Whitner St., Anderson, SC (US) 29624

( * ) Notice: Subject to any disclaimer, the term of this patent is extended or adjusted under 35 U.S.C. 154(b) by 238 days.

(21) Appl. No.: 10/742,252

(22) Filed: Dec. 19, 2003

(65) Prior Publication Data

US 2005/0132939 A1 Jun. 23, 2005

(51) Int. Cl.
*A47B 23/00* (2006.01)
(52) U.S. Cl. .................... 108/43; 273/309
(58) Field of Classification Search ............ 108/43, 108/59, 92, 94, 96, 5, 102, 106, 116, 124, 108/144.11, 147.19, 44, 45, 50.16; 273/148 B, 273/309; 297/423.11, 423.12, 423.41, 172; 248/125.8, 125.9, 133, 149
See application file for complete search history.

(56) References Cited

U.S. PATENT DOCUMENTS

| 122,134 | A | * | 12/1871 | Ross ........................... 108/106 |
| 2,914,116 | A | * | 11/1959 | Gohmann ....................... 108/1 |
| 3,132,835 | A | * | 5/1964 | Drabert ........................ 248/397 |
| 3,361,088 | A | * | 1/1968 | Hodgkin ....................... 108/12 |
| 3,967,562 | A | * | 7/1976 | Anacker ........................ 108/12 |
| 4,343,245 | A | * | 8/1982 | Edwards ....................... 108/193 |
| 4,410,214 | A | * | 10/1983 | Geschwender .............. 297/118 |
| 4,441,758 | A | * | 4/1984 | Fleischer et al. ........ 297/423.46 |
| 4,494,754 | A | * | 1/1985 | Wagner, Jr. ............. 273/148 B |
| 4,648,603 | A | * | 3/1987 | Hayford, Jr. ............ 273/148 B |
| 4,672,898 | A | * | 6/1987 | Davidson ....................... 108/6 |
| 4,852,499 | A | * | 8/1989 | Ozols ........................... 108/44 |
| 5,148,152 | A | * | 9/1992 | Stueckle et al. ............ 345/156 |
| 5,169,210 | A | * | 12/1992 | Fricano ................. 297/188.21 |
| D334,487 | S |   | 4/1993 | Perry |
| D337,216 | S |   | 7/1993 | Boyd |
| D339,612 | S | * | 9/1993 | Carter et al. ............... D14/419 |
| 5,417,168 | A | * | 5/1995 | Soper .......................... 108/124 |
| 5,437,453 | A |   | 8/1995 | Hineman |
| 5,551,701 | A | * | 9/1996 | Bouton et al. ................ 463/36 |
| 5,552,807 | A | * | 9/1996 | Hayes et al. ................ 345/156 |
| 5,577,806 | A | * | 11/1996 | Ugalde .................... 297/423.46 |
| 5,730,408 | A | * | 3/1998 | McAllister et al. ..... 248/288.51 |
| 5,771,613 | A | * | 6/1998 | Geils et al. .................. 108/150 |
| 5,829,745 | A | * | 11/1998 | Houle ..................... 273/148 B |
| 5,857,986 | A | * | 1/1999 | Moriyasu ...................... 601/49 |
| 6,008,797 | A | * | 12/1999 | Sanderson et al. .......... 345/156 |
| 6,033,014 | A | * | 3/2000 | Nightengale ............ 297/174 R |
| 6,039,392 | A | * | 3/2000 | Dencker ................. 297/172 |
| 6,044,772 | A | * | 4/2000 | Gaudette et al. .............. 108/43 |

(Continued)

FOREIGN PATENT DOCUMENTS

DE 3728717 A1 * 3/1989

(Continued)

*Primary Examiner*—José V. Chen
(74) *Attorney, Agent, or Firm*—McNair Law Firm, P.A.

(57) ABSTRACT

An ergonomically contoured frame for accommodating a person in a seated position includes an upper section carried by a base section. The base section includes upwardly extending legs, while the upper section includes downwardly extending legs for adjustably interconnecting with the upwardly extending legs to vary the height of the controller stand to accommodate different players. The base section includes a generally U-shaped base carrying the upwardly extending legs. The upper section has a generally U-shaped top integral with and interconnecting the downwardly extending legs. A foot controller platform is carried by the base section for carrying a foot controller for a video game. A hand controller platform is carried by the upper section for carrying a hand controller for a video game. Securing members are carried by the platforms for securing the controllers to each platform.

20 Claims, 3 Drawing Sheets

U.S. PATENT DOCUMENTS

| | | |
|---|---|---|
| D427,789 S | 7/2000 | Hill |
| 6,220,180 B1 * | 4/2001 | Janowitz .................. 108/50.01 |
| 6,251,015 B1 * | 6/2001 | Caprai ........................ 463/36 |
| D446,951 S | 8/2001 | Sheedy |
| 6,279,906 B1 * | 8/2001 | Sanderson et al. ...... 273/148 B |
| 6,332,407 B1 * | 12/2001 | Vardaro .................. 108/50.01 |
| 6,374,752 B1 * | 4/2002 | Walser .................... 108/50.01 |
| 6,398,326 B1 * | 6/2002 | Wang ...................... 312/223.3 |
| D460,760 S * | 7/2002 | Whitehorn et al. ........ D14/419 |
| D466,727 S | 12/2002 | Abboud et al. |
| 6,611,250 B1 * | 8/2003 | Prince et al. ................ 345/163 |
| 6,663,058 B1 * | 12/2003 | Peterson et al. ......... 248/125.9 |
| 6,776,104 B1 * | 8/2004 | Herbst ........................ 108/25 |
| 6,843,183 B1 * | 1/2005 | Strong .................. 108/147.19 |
| 6,874,429 B1 * | 4/2005 | Bosman et al. ................ 108/59 |
| 2004/0216645 A1 * | 11/2004 | Lin .......................... 108/50.01 |

FOREIGN PATENT DOCUMENTS

FR           2811527 A1 *   1/2002

\* cited by examiner

VIDEO GAME CONTROLLER STAND

FIELD OF THE INVENTION

The present invention relates to video games, and more particularly, to an ergonomic controller stand adapted for carrying video game controllers to facilitate use of the controllers.

BACKGROUND OF THE INVENTION

Many video games attempt to simulate the experience of driving and flying all types of vehicles. As the games have become more advanced and realistic, so have the controllers. For example, controllers for a driving game may include a steering wheel, gear shifter, clutch, brake and gas pedals. A flying game may have a steering yoke, throttle, and rudder pedals. The problem that arises is positioning the hand and foot controls in the functional arrangements as they would commonly be found in a car or airplane, and maintaining the controllers in place during game play. Some types of controllers include brackets for mounting the controller to a table. However, this requires that the television be placed in front of the table, which may be highly inconvenient. Additionally, there is nothing to keep a foot controller from sliding around under the table during operation. Other controllers may be strapped to the player's lap, which is not the normal functional position of the controller and make the controller difficult to use, especially in combination with a foot controller. Most controllers do not include any fastening means for mounting or holding the controllers in place.

While the prior art is replete with various controllers, stands, and seats having integrated controllers for hand controls, none address the problem of positioning both hand and foot controls in an ergonomic, functional, and stable arrangement as would be found in a car or plane. For example, U.S. Pat. No. 6,044,772 discloses a game controller stand for mounting a steering wheel, or the like, which is connected to a game console. However, the stand does not provide any means for mounting a foot controller which is typically used in most automotive racing games.

Accordingly, it is an object of the present invention to provide a game controller stand having means for mounting hand and foot controllers in ergonomic and functional operating positions.

It is another object of the present invention to provide securing means for holding the hand and foot controllers in position on the stand during game play.

It is another object of the present invention to provide an adjustable ergonomic frame for the stand which allows the height of the stand to be adjusted to accommodate different players.

SUMMARY OF THE INVENTION

The above objectives are accomplished according to the present invention by providing an ergonomic video game controller stand for accommodating a player in a seated position to operate and interact with a video game. In a preferred embodiment, the stand comprising a contoured frame having a U-shaped base section for resting on a floor, and an upper section carried above the base section. The base section has a pair of curved upwardly extending legs that extend substantially over the U-shaped base section to position the upper section generally above and toward the front of the base section. The upper section has a pair of downwardly extending legs for interconnecting with the upwardly extending legs of the base section to define a game controller operating cockpit for accommodating a seated player to operate game controls. A foot controller platform is carried by the base section for mounting a foot controller, and a hand controller platform is carried by the upper section for mounting a hand controller. The hand controller and foot controller are ergonomically positioned when mounted to the hand controller platform and the foot controller platform for operation by the player seated in the cockpit.

In a further advantageous embodiment, a first controller securing member is carried by the hand controller platform for securing the hand controller to the hand controller platform to prevent dislodging of the hand controller during use by the player. Additionally, a second controller securing member is carried by the foot controller platform for securing the foot controller to the foot controller platform to prevent dislodging of the foot controller during use by the player.

Preferably, an accessory platform is carried by the upper section generally adjacent the hand controller platform for mounting a secondary hand controller in an ergonomic position relative to the hand controller to allow the player to operate the secondary hand controller in combination with the hand controller and foot controller when in a seated position within the cockpit.

In a particularly advantageous embodiment, an adjusting mechanism connects the upwardly extending legs of the base section and the downwardly extending legs of the upper section to vary the height of the controller stand to accommodate different players.

Preferably, the upper section of the stand includes a curved crossmember integral with and interconnecting the downwardly extending legs to further define the cockpit together with the base section.

Accordingly, a controller stand is provided to facilitate playing video games by securely carrying both foot and hand controllers in ergonomically and functionally arranged operating positions, while allowing the height of the hand controllers to be adjusted to accommodate different heights of the users.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
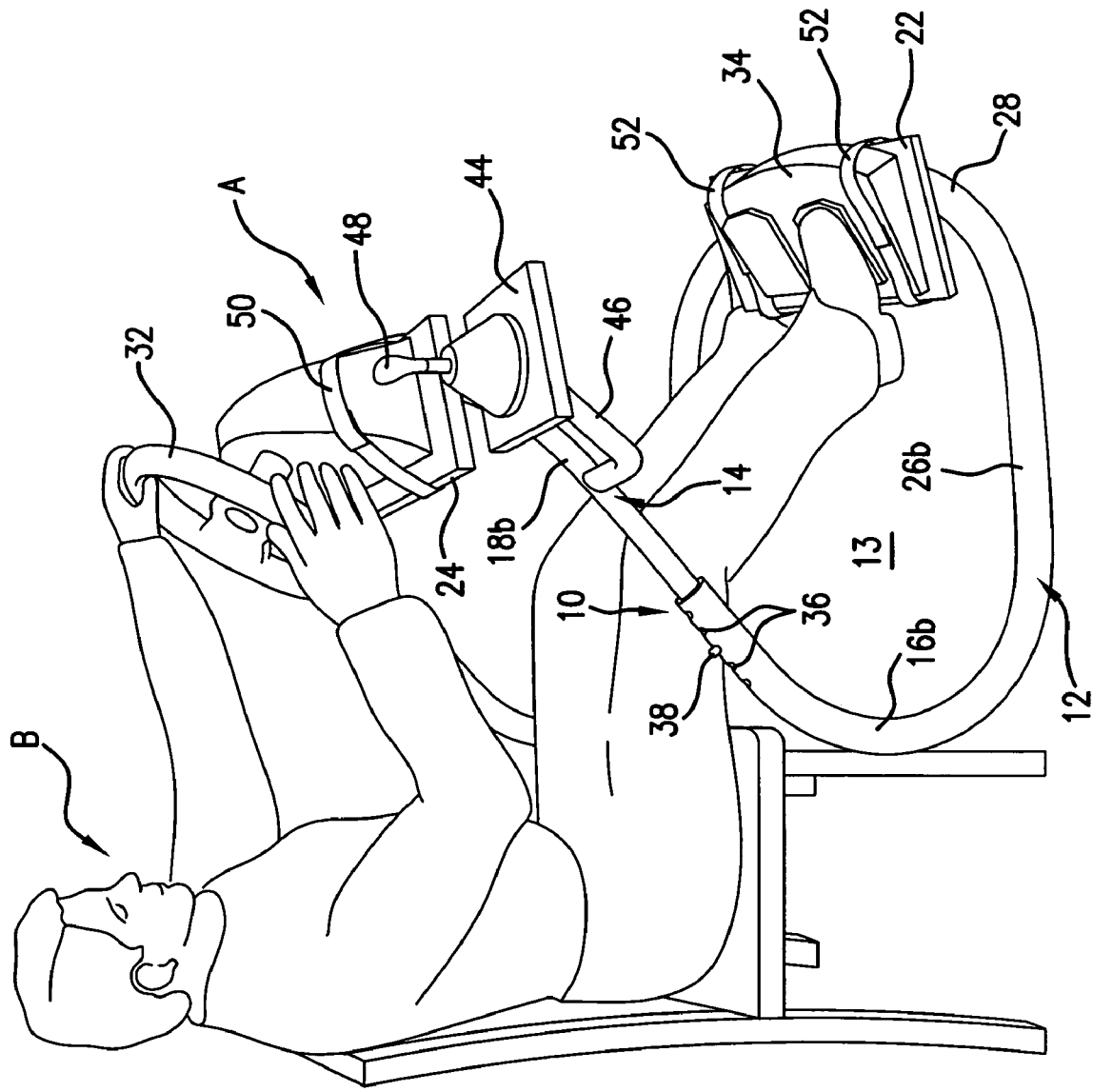
FIG. 1 shows a perspective view of a player interacting with the controller stand according to the invention.
Figure 2:
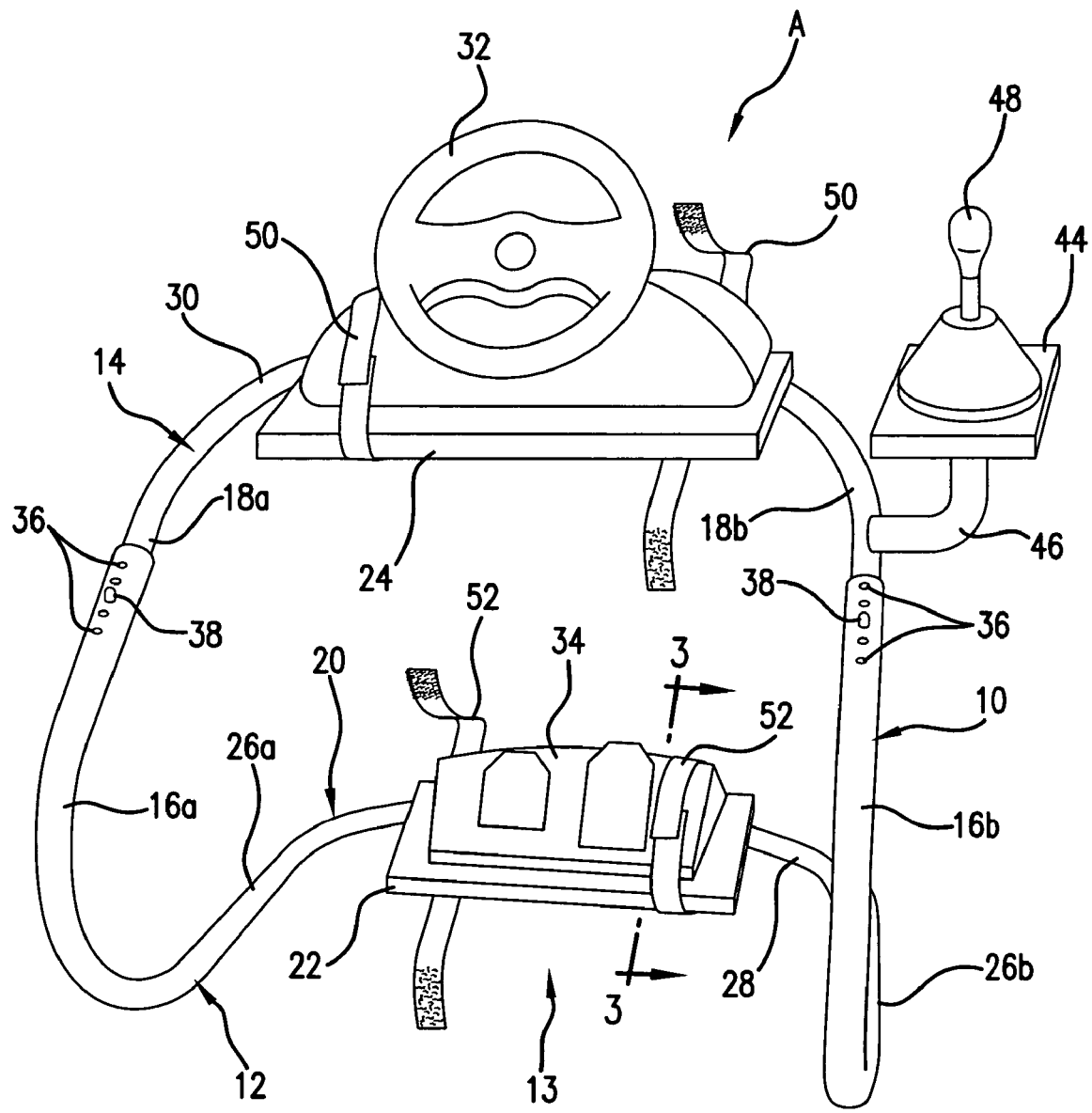
FIG. 2 shows a perspective view of the controller stand according to the invention.

With reference to the drawings, the invention will now be described in more detail. An ergonomic video game controller stand is shown generally by reference letter A in FIG. 1, which is adapted for accommodating a player in a seated position, designated generally as B, to operate and interact with a video game. Referring to FIGS. 1 and 2, controller stand A comprises a contoured frame, designated generally as 10. The contoured frame has a base section, shown generally by reference number 12, adapted for resting on a floor to provide a stable support for the stand. Carried by base section 12 is an upper section, shown generally by reference number 14. Base section 12 includes a pair of curved upwardly extending legs 16a and 16b extending substantially over the base section. Upper section 14 includes a pair of downwardly extending legs 18a and 18b adapted for interconnecting with upwardly extending legs 16a and 16b of base section 12. A hand controller platform 24 is carried by upper section 14 adapted for receiving and securing a hand controller 32, such as a steering wheel and the like, for a video game. Advantageously, a foot controller platform 22 is carried by base section 12 which is adapted for receiving and securing a foot controller 34, such as gas and brake pedals, for a video game.

When upper section 14 is interconnected with base section 12, frame 10 comprises a closed loop contoured frame constructed and arranged to position upper section 14 vertically above base section 12 and generally extending towards the front of base section 12 to define a game controller operating cockpit, designated generally as 13, for accommodating a seated player to operate game controls. Preferably, frame 10 is made out of metal or plastic tubing, which in the closed loop arrangement eliminates any sharp corners and ends which might cause injury to the user. Advantageously, hand controller 32 and foot controller 34 are ergonomically positioned when mounted to hand controller platform 24 and the foot controller platform 22, respectively, for operation by the player seated in cockpit 13.

In a preferred embodiment illustrated by way of example in FIGS. 1 and 2, base section 12 includes a generally U-shaped base, designated generally as 20, adapted for resting evenly on a floor. The U-shaped base has a pair of laterally spaced horizontally aligned base frame members 26a and 26b connected by a lower transverse support 28, generally disposed at a distal end of the base frame members which is curved to integrally connect with the base frame members. Base frame members 26a and 26b each carry one of curved upwardly extending legs 16a and 16b, respectively, generally at an opposite distal end of the base frame member to transverse support 28 so that the upwardly extending legs curve substantially back overtop of the base frame members and extend towards the front of the U-shaped base. Additionally, upper section 14 comprises a generally U-shaped top, which includes downwardly extending legs 18a and 18b for interconnecting with base section 12. The U-shaped top of upper section 14 is comprised of downwardly extending legs 18a and 18b connected by upper transverse support 30. Upper transverse support 30 provides a crossmember between downwardly extending legs 18a and 18b, which is curved to integrally connect with the downwardly extending legs.

Figure 3:
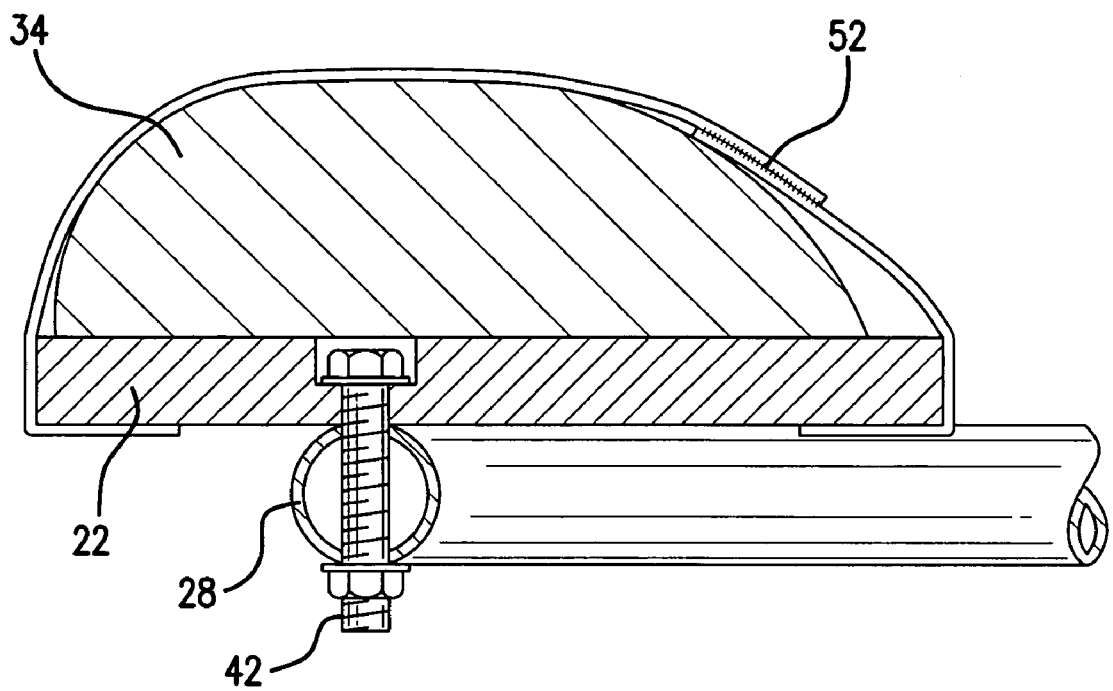
FIG. 3 shows a cross-section view of the hand and foot controller platforms carried by the controller stand according to the invention; and, FIG. 4 shows a cross-section view of the adjustable connection between the base stand section and upper stand sections according to the invention.
Figure 4:
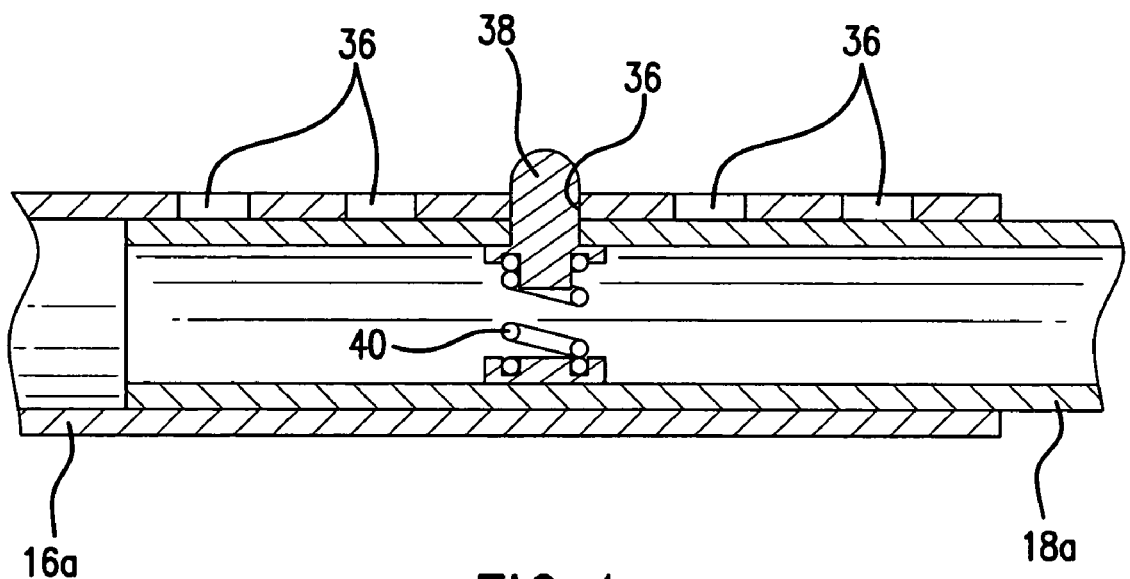

Referring to FIGS. 2 and 4, an adjusting mechanism is provided for interconnecting downwardly extending legs 18a and 18b with upwardly extending legs 16a and 16b to vary the height at which hand controller platform 24 carries hand controller 32 to accommodate different people using the stand. To provide the readily adjustable frame, downwardly extending legs 18a and 18b are received in upwardly extending legs 16a and 16b in a telescoping arrangement. Upwardly extending legs 16a and 16b include a series of vertically spaced openings 36 adapted for receiving a pin 38 carried by downwardly extending legs 18a and 18b. As best shown in FIG. 3, pin 38 is biased by spring 40 to extend outwardly from downwardly extending legs 18a and 18b to engage openings 36. By depressing the pins, upper section 14 may be quickly raised and lowered to better accommodate the person using the stand.

Referring to FIGS. 2 and 3, as noted above, base section 12 includes lower transverse support 28 forming a portion of U-shaped base 20, and upper section 14 includes upper transverse support 30 forming a portion of said U-shaped top of the upper section. In the preferred embodiment, lower platform 22 is affixed to lower transverse support 28, while upper platform 24 is affixed to upper transverse support 30. As best shown in FIG. 3, foot controller platform 22 is affixed to the lower crossbar using bolt 42. The same arrangement is also provided for affixing upper platform 24 to upper transverse support 30. Preferably, at least two bolts which are laterally spaced along the transverse support are provided for affixing the platforms to the frame. However, it should be noted that various other attachment methods may also be used such as brackets, welding, straps, and the like, well known to those skilled in the art. The bolt shown affixing foot controller platform 22 is only for illustrative purposes of a preferred embodiment and intended as an example of one of many possible commonly known attachment methods.

Foot and hand controller platforms 22 and 24 are generally rectangular in shape and may be made of medal, plastic, wood, or other lightweight composite material capable of supporting the hand and foot controllers. Additionally, the edges of the platforms may be rounded or covered with a cushioning material, such as rubber, to prevent injury. Additionally, the top surface is preferably flat to provide a universal level surface for securing a variety of foot and hand controllers of various shapes and sizes. Alternatively, the platforms may be contoured as necessary or desirable to facilitate receiving and securing the controllers and to facilitate playing of the video game in general, or the platform may be adapted for use with a particular game and set of controls. Also, the platforms are preferably covered with a non-skid type material to prevent movement of the controllers during use.

Referring to FIGS. 1 and 2, in a preferred embodiment, an accessory platform 44 is carried by upper section 14 generally adjacent hand controller platform 24 for mounting a secondary hand controller in an ergonomic position relative to hand controller 32 to allow the player to operate the secondary hand controller in combination with hand controller 32 and foot controller 34 when in a seated position within the cockpit. Accessory platform 44 is preferably of the same construction and arrangement as the hand and foot controller platforms. An upper frame arm 46 extends upwardly from downwardly extending leg 18b and carries accessory platform 44. Accessory platform 44 is adapted for receiving and securing a secondary hand controller 48, such as a gear shifter or joystick, in the same manner as described above for upper platform 24 and lower platform 22. Preferably, accessory platform 44 is positioned in a common plane with hand controller platform 24. Accessory platform 44 may also be attached using the bolting arrangement described above, or other commonly known attachment methods.

Advantageously, securing means are provided for maintaining the controllers in place on the platforms. Referring to FIGS. 2 and 3, the securing means of the preferred embodiment comprise at least one first controller securing member 50 carried by hand controller platform 24 for securing hand controller 32 to the hand controller platform, and at least one second controller securing member 52 carried by foot controller platform 22 for securing foot controller 34 to the foot controller platform to prevent dislodging of the hand and foot controllers from their platforms during use by the player. An additionally securing member may also be carried by accessory platform 44 for securing secondary hand controller 48 to the accessory platform. Preferably, the securing members comprise straps affixed to the bottom side of the platforms, as best shown in FIG. 3, with hook and loop connectors carried at distal ends of the straps for wrapping around the controllers and interconnecting to hold the controllers on the platforms. On accessory platform 44, instead of straps, hook and loop connectors are placed on the bottom of secondary hand controller 48 and the upper surface of accessory platform 44 to secure the controller to the platform. The same technique may also be used to attach hand controller 32 and foot controller 34 to their respective platforms. While the securing means described above are preferred, it is to be understood that any other suitable conventional securing means may be provided for attachment of the controllers to the platforms, including permanent surface attachment using bolts, suction cups on the platform, controller casing which conform to the shape of the base of the controller, elastic bands, etc.

While a preferred embodiment of the invention has been described using specific terms, such description is for illustrative purposes only, and it is to be understood that changes and variations may be made without departing from the spirit or scope of the following claims.

What is claimed is:

1. An ergonomic video game controller stand adapted to adjust the height of the stand to accommodate different user sizes, said controller stand comprising:
    a generally U-shaped base section for resting evenly on a floor, and a generally U-shaped upper section integral with and carried above said base section, wherein said base section and said upper section extend in a common horizontal direction;
    a pair of curved upwardly extending legs integral with said base section that extend substantially back overtop of said U-shaped base section at an acute angle to said base section so that said upper section is positioned generally overtop of a front of said base section;
    a pair of downwardly extending legs integral with said upper section for interconnecting with said upwardly extending legs of said base section so that said upper section, said base section, said upwardly extending legs and said downwardly extending legs form a continuous unitary contoured frame defining a game controller operating cockpit for receiving the user to operate game controls;
    a foot controller platform carried by said base section for mounting a foot controller, and;
    a hand controller platform carried by said upper section for mounting a hand controller;
    whereby said hand controller and foot controller are ergonomically positioned to reduce operator fatigue and discomfort when mounted to said hand controller platform and said foot controller platform.

2. The stand of claim 1 including a first controller-securing member carried by said hand controller platform for securing said hand controller to said hand controller platform to prevent dislodging of said hand controller during use.

3. The stand of claim 1 including a second controller-securing member carried by said foot controller platform for securing said foot controller to said foot controller platform to prevent dislodging of said foot controller during use.

4. The stand of claim 1 including an accessory platform carried by said upper section generally adjacent said hand controller platform for mounting a secondary hand controller in an ergonomic position relative to said hand controller to allow operation of said secondary hand controller in combination with said hand controller and foot controller from within said cockpit.

5. The stand of claim 1 including an adjusting mechanism connecting said upwardly extending legs of said base section and said downwardly extending legs of said upper section to vary the height of said controller stand.

6. The stand of claim 1 wherein said upper section of said stand includes a curved crossmember integral with and interconnecting said downwardly extending legs to define said cockpit together with said base section.

7. A video game controller stand comprising:
    a generally U-shaped base section adapted for resting wholly on a floor, and a generally U-shaped upper section integral with and carried by said base section; each arm of the U-shaped base section connected to a respective arm of the U-shaped upper section; wherein said base section and said upper section extend in a common horizontal direction and said upper section extends overtop of said base section toward a front end of said base section to form a continuous unitary contoured frame defining a game controller operating cockpit space for receiving a user to operate game controls;
    a foot controller platform carried by said base section;
    a foot controller carried by said foot controller platform for being operated from said cockpit;
    a hand controller platform carried by said upper section;
    a hand controller carried by said hand controller platform for being operated from said cockpit;
    whereby said hand controller and foot controller are ergonomically positioned by said upper section and base section, respectively, in a functionally spaced arrangement to facilitate simultaneous operation of said hand and foot controllers from said cockpit to operate the video game.

8. The stand of claim 7 including a first controller-securing member carried by said hand controller platform for securing said hand controller to said hand controller platform, and a second controller securing member carried by said foot controller platform for securing said foot controller to said foot controller platform to prevent dislodging of said hand and foot controllers from their platforms during use.

9. The stand of claim 7 including an accessory platform carried by said upper frame section; a secondary hand controller carried by said accessory platform in an ergonomically and functionally arranged position relative to said hand controller on said hand controller platform to allow operation of said secondary hand controller in combination with said hand controller and foot controller from within said cockpit.

10. The stand of claim 7 wherein said base section comprises a generally U-shaped base carrying a pair of curved upwardly extending legs connecting with and supporting said upper section.

11. The stand of claim 10 wherein said upper section comprises a generally U-shaped top having a pair of downwardly extending legs interconnecting with said upwardly extending legs of said base section.

12. The stand of claim 11 wherein said downwardly extending legs of said U-shaped top are adjustably Interconnected with said upwardly extending legs of said U-shaped base through en adjusting mechanism to vary the height of said controller stand.

13. The stand of claim 7 wherein said base section includes a pair of elongated base frame members laterally spaced and horizontally aligned for resting on a floor to provide stable floor support; each of said base frame members carrying an upwardly extending leg for connecting with said upper section; and a lower transverse support spanning said base frame members for carrying said foot controller platform.

14. The stand of claim 13 wherein said upper section includes a pair of downwardly extending frame legs interconnecting with said upwardly extending leg of said base section; an upper transverse support interconnecting said pair of downwardly extending frame legs.

15. A video game controller stand comprising:
U-shaped upper section carried by a U-shaped base section, wherein said upper section and base section extending in a common horizontal direction;
said base section having a pair of laterally spaced interconnected base frame members with upwardly extending curved frame legs extending back over said base frame members at an acute angle to said base frame members;
a lower transverse support included in said base section disposed between said base frame members for interconnecting said base frame members that extends in a generally horizontal arrangement perpendicular to said base frame members;
a foot controller platform carried by said lower transverse support for carrying a foot controller;
said upper section having a pair of interconnected downwardly extending frame legs integrally connecting with said upwardly extending frame legs of said base section so that said upper section extends towards a front of said base section at an acute angle to said base section to form a continuous unitary contoured frame defining a game controller operating cockpit space for receiving a user to operate game controls;
an upper transverse support included in said upper section disposed between said downwardly extending frame legs for interconnecting said downwardly extending frame legs that extends in a generally common horizontal direction with said lower transverse support and generally perpendicular to said downwardly extending frame legs;
a hand controller platform carded by said upper transverse support for carrying a hand controller;
whereby said hand controller and foot controller are ergonomically positioned by said upper section and base section, respectively, in a functionally spaced arrangement to promote simultaneous operation of said hand and foot controllers from said cockpit to operate the video game.

16. The stand of claim 15 including en adjusting mechanism connecting said upwardly extending frame legs of said base section and said downwardly extending frame legs of said upper section to vary the height of said controller stand.

17. The stand of claim 15 including a first controller-securing member carried by said hand controller platform for securing said hand controller to said hand controller platform, and a second controller securing member carded by said foot controller platform for securing said foot controller to said foot controller platform to prevent dislodging of said hand and foot controllers from their platforms during use.

18. The stand of claim 15 including an accessory platform carried by said upper section generally adjacent said hand controller platform for mounting a secondary hand controller in an ergonomically and functionally arranged position relative to said hand controller on said hand controller platform to allow operation of said secondary hand controller in combination with said hand controller and foot controller from within said controller cockpit.

19. The stand of claim 15 wherein said base frame members and said lower transverse support of said base section comprises a generally U-shaped base carrying said upwardly extending frame legs for supporting said upper section.

20. The stand of claim 19 wherein said downwardly extending frame legs and upper transverse support of said upper section comprises a generally U-shaped top interconnecting with said upwardly extending frame legs of said generally U-shaped base.

* * * * *